United States Patent
Kubota et al.

(10) Patent No.: US 9,838,898 B2
(45) Date of Patent: Dec. 5, 2017

(54) METHOD, APPARATUS AND COMPUTER PROGRAM FOR MEASURMENT REPORT MESSAGES TRANSMISSION IN A WIRELESS DEVICE

(71) Applicant: AVAGO TECHNOLOGIES GENERAL IP (SINGAPORE) PTE. LTD., Singapore (SG)

(72) Inventors: Keiichi Kubota, Surrey (GB); Manmohan Singh, Farnborough (GB); Brian Alexander Martin, Surrey (GB)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 433 days.

(21) Appl. No.: 14/411,300

(22) PCT Filed: Jun. 26, 2013

(86) PCT No.: PCT/IB2013/055250
§ 371 (c)(1),
(2) Date: Dec. 24, 2014

(87) PCT Pub. No.: WO2014/002031
PCT Pub. Date: Jan. 3, 2014

(65) Prior Publication Data
US 2015/0327102 A1    Nov. 12, 2015

(30) Foreign Application Priority Data
Jun. 28, 2012 (GB) .................................. 1211455.9

(51) Int. Cl.
*H04M 3/00* (2006.01)
*H04W 24/10* (2009.01)
(Continued)

(52) U.S. Cl.
CPC ......... *H04W 24/10* (2013.01); *H04W 52/146* (2013.01); *H04W 56/001* (2013.01); *H04W 88/02* (2013.01)

(58) Field of Classification Search
USPC ......................................................... 455/418
See application file for complete search history.

(56) References Cited

U.S. PATENT DOCUMENTS

2005/0159147 A1  7/2005  Roberts et al.
2009/0054063 A1  2/2009  Roberts et al.
(Continued)

FOREIGN PATENT DOCUMENTS

EP    1 558 048 A1   7/2005
GB    2 491 277 A   11/2012

OTHER PUBLICATIONS

International Search Report dated Dec. 18, 2013 in PCT/IB2013/055250 filed Jun. 26, 2013.

*Primary Examiner* — Joel Ajayi
(74) *Attorney, Agent, or Firm* — Oblon, McClelland, Maier & Neustadt, L.L.P.

(57) ABSTRACT

A wireless device determines (300) that wireless transmissions to a network are not possible. The wireless device suspends (310) passing of measurement report messages to a lower layer of the wireless device for transmission to the network by the wireless device if the wireless device determines that wireless transmissions to the network are not possible. In an example, while passing of measurement report messages to the lower layer of the wireless device is suspended, the wireless device buffers (320) less than a predetermined number of measurement report messages.

16 Claims, 4 Drawing Sheets

(51) Int. Cl.
*H04W 52/14* (2009.01)
*H04W 56/00* (2009.01)
*H04W 88/02* (2009.01)

(56) References Cited

U.S. PATENT DOCUMENTS

2010/0136920 A1 6/2010 Shrivastava et al.
2010/0271952 A1 10/2010 Nickisck
2012/0120898 A1 5/2012 Nickisch

METHOD, APPARATUS AND COMPUTER PROGRAM FOR MEASURMENT REPORT MESSAGES TRANSMISSION IN A WIRELESS DEVICE

CROSS REFERENCE TO RELATED APPLICATION

This application claims the benefit under 35 U.S.C. §119 and 37 CFR §1.55 to UK patent application no. 1211455.9, filed on Jun. 28, 2012, the entire content of which is incorporated herein by reference.

TECHNICAL FIELD

The present invention relates to a method of operating a wireless device, apparatus comprising a processing system for a wireless device, and a computer program. Examples of embodiments of the present invention suspend passing of measurement report messages to a lower layer of a wireless device if it is determined that wireless transmissions to the network are not possible.

BACKGROUND

The following abbreviations which may be found in the specification and/or the drawing figures are defined as follows:
3GPP Third Generation Partnership Project
eNB, eNodeB evolved Node B/base station in an E-UTRAN system
BLER BLock Error Rate
CELL_DCH dedicated channel state
CELL_FACH forward access channel state
CSG closed subscriber group
E-DCH enhanced uplink dedicated channel state
E-UTRAN Evolved UTRAN (LTE)
GSM Global System for Mobile Communications
LTE Long Term Evolution
MAC media access control
RAT radio access technology
RLC radio link control
RRC radio resource control
SDU service data unit
SIR signal to interference ratio
TDD time division duplex
TPC transmit power control
UE user equipment
UMTS Universal Mobile Telecommunications System
UTRAN Universal Terrestrial Radio Access Network In wireless communication systems, such as a cellular wireless network in which wireless devices communicate via a network interface comprising a radio transceiver to a network of base stations connected to a telecommunications network, it is common for the wireless devices to carry out some form of cell update procedure. This enables the network to hand over control of and radio coverage for the wireless device to another cell/base station. It has been observed that in practice in some situations, a voice call may be dropped or some other connectivity is lost unexpectedly during such a cell update procedure.

SUMMARY

According to a first aspect of the present invention, there is provided a method of operating a wireless device, the method comprising:

the wireless device determining that wireless transmissions to a network are not possible; and the wireless device suspending passing of measurement report messages to a lower layer of the wireless device for transmission to the network by the wireless device if the wireless device determines that wireless transmissions to the network are not possible.

In examples of embodiments of the present invention, this helps to minimise delay in the wireless device being able to transmit other messages or data once wireless transmissions to the network can be resumed. In a particular example, this includes the wireless device sending a response to receiving a cell update confirm message during a cell update procedure, which therefore reduces the likelihood that the network will regard the connection with the wireless device as lost and thus minimise the dropping of calls or other loss of connectivity for the user.

In an embodiment, the wireless device determines that wireless transmissions to the network are not possible if the received signal quality at the wireless device from the network falls below a predetermined threshold for a predetermined period of time.

In an embodiment, the wireless device determines that wireless transmissions to the network are not possible if a physical layer of the device notifies a radio resource control entity of the wireless device that an out of sync condition has been detected.

In an embodiment, the wireless device determines that wireless transmissions to the network are not possible if the transmit power commanded by the network exceeds the maximum allowed uplink transmit power that the wireless device can achieve. In some wireless systems, this is referred to as the "uplink power-limited case" as discussed in more detail below.

In an embodiment, whilst passing of measurement report messages to the lower layer of the wireless device is suspended, the wireless device buffers less than a predetermined number of measurement report messages. In an embodiment, whilst passing of measurement report messages to the lower layer of the wireless device is suspended, the wireless device buffers a single measurement report message for the or each measurement event and for the or each periodic measurement. In either case, this further helps to minimise any delay in the wireless device being able to transmit other messages or data once wireless transmissions to the network can be resumed. In an embodiment, if a new measurement report message is generated for one of the measurement events or periodic measurements, the new measurement report message is buffered in place of the previously buffered measurement report message for said measurement event or periodic measurement. This serves to keep the buffered measurement report message(s) current and relevant.

In an embodiment, the method comprises the wireless device resuming passing of measurement report messages to the lower layer of the wireless device for transmission to the network by the wireless device if the wireless device determines that wireless transmissions to the network may be resumed.

In an embodiment, the method comprises the wireless device transmitting an uplink message other than the measurement report messages to the network prior to transmitting the measurement report messages to the network when the wireless device has determined that wireless transmissions to the network may be resumed. This helps to ensure that other uplink messages, which may be more important or a higher priority than the measurement report messages, are transmitted quickly upon resumption of uplink data transmissions. In an embodiment, said other uplink message is at least one of an RRC response message for a CellUpdateConfirm, a reconfiguration command message, a security mode command message and an RRC signalling connection release indication messages (SignallingConnectionReleaseIndication message).

In an embodiment, the method comprises the wireless device discarding buffered measurement report messages that are no longer valid to avoid transmission of said measurement report messages that are no longer valid when the wireless device determines that wireless transmissions to the network may be resumed. This saves unnecessary transmission of measurement report messages that are no longer useful and can also reduce the time delay before other messages can be transmitted.

According to a second aspect of the present invention, there is provided apparatus comprising a processing system for a wireless device constructed and arranged to:

determine whether or not wireless transmissions to a network by a said wireless device are possible; and suspend passing of measurement report messages to a lower layer of the wireless device for transmission to a said network by the wireless device if the wireless device determines that wireless transmissions to a said network are not possible.

The apparatus may be configured to operate according to at least one of Universal Mobile Telecommunications System and Long Term Evolution.

There may be provided a wireless device comprising apparatus comprising a processing system as described above.

According to a third aspect of the present invention, there is provided a computer program comprising instructions such that when the computer program is executed on a wireless device, the wireless device is arranged to:

determine whether or not wireless transmissions to a network by a said wireless device are possible; and suspend passing of measurement report messages to a lower layer of the wireless device for transmission to a said network by the wireless device if the wireless device determines that wireless transmissions to a said network are not possible.

There may be provided a non-transitory computer-readable storage medium comprising a set of computer-readable instructions stored thereon, which, when executed by a processing system, cause the processing system to carry out a method as described above.

The processing system described above may comprise at least one processor and at least one memory including computer program instructions, the at least one memory and the computer program instructions being configured to, with the at least one processor, cause the apparatus at least to perform as described above.

Further features and advantages of the invention will become apparent from the following description of preferred embodiments of the invention, given by way of example only, which is made with reference to the accompanying drawings.

DETAILED DESCRIPTION

"Wireless devices" include in general any device capable of connecting wirelessly to a network, and includes in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc. The term "user equipment" or UE is often used to refer to wireless devices in general, and particularly mobile wireless devices.

Reference will sometimes be made in this specification to "network", "network control apparatus" and "base station". In this respect, it will be understood that the "network control apparatus" is the overall apparatus that provides for general management and control of the network and connected devices. Such apparatus may in practice be constituted by several discrete pieces of equipment. As a particular example in the context of UMTS (Universal Mobile Telecommunications System), the network control apparatus may be constituted by for example a so-called Radio Network Controller operating in conjunction with one or more Node Bs (which, in many respects, can be regarded as "base stations"). As another example, LTE (Long Term Evolution) makes use of a so-called evolved Node B (eNB) where the RF transceiver and resource management/control functions are combined into a single entity. The term "base station" is used in this specification to include a "traditional" base station, a Node B, an evolved Node B (eNB), or any other access point to a network, unless the context requires otherwise. Moreover for convenience and by convention, the terms "network", "network control apparatus" and "base station" will often be used interchangeably, depending on the context.

Figure 1:
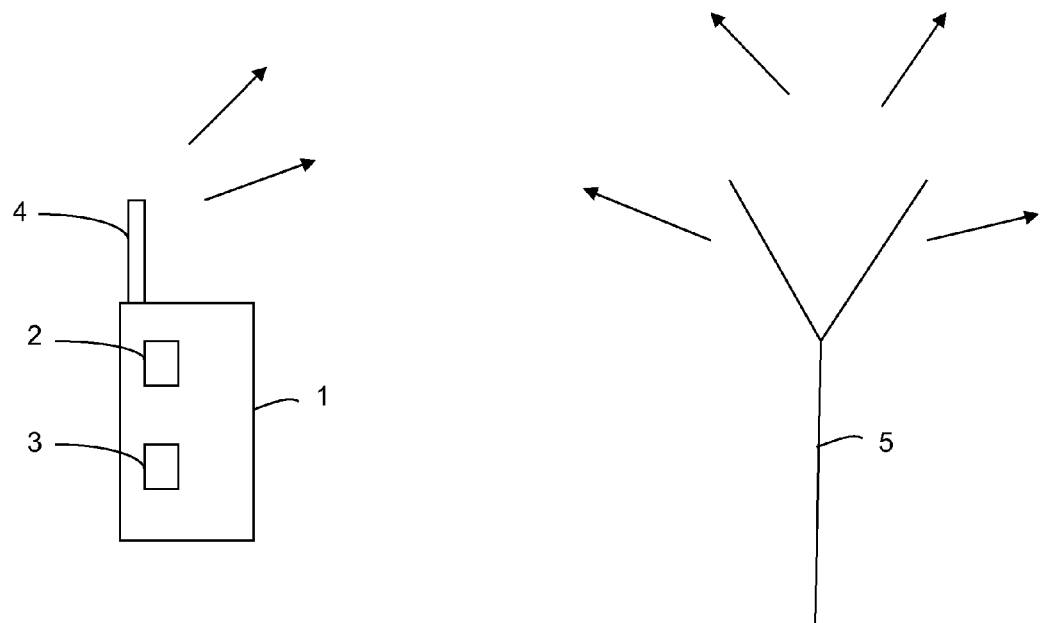
FIG. 1 shows schematically a wireless device in communication with a network.
Figure 1:
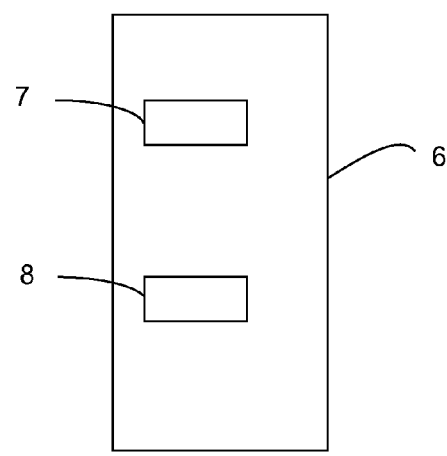

FIG. 1 shows schematically a wireless device or UE 1, in this case in the form of a mobile phone/smartphone 1. The user equipment 1 contains the necessary radio module 2, processor(s) and memory/memories 3, antenna 4, etc. to enable wireless communication with the network. The user equipment 1 in use is in communication with a radio mast 5. As mentioned, as a particular example in the context of UMTS, there may be a network control apparatus 6 (which may be constituted by for example a so-called Radio Network Controller) operating in conjunction with one or more Node Bs (which, in many respects, can be regarded as "base stations"). Again as mentioned, as another example, LTE makes use of a so-called Evolved Node B (eNB) where the RF transceiver and resource management/control functions are combined into a single entity. The term "base station" is used in this specification to include a "traditional" base station, a Node B, an evolved Node B (eNB), or any other access point to a network, unless the context requires otherwise. The network control apparatus 6 (of whatever type) may have its own processor(s) 7 and memory/memories 8, etc.

In wireless communication systems, such as cellular wireless networks in which wireless devices communicate via a network interface comprising a radio transceiver to a network of base stations connected to a telecommunications network, it is common for the wireless devices to send results of measurements of the serving cell and neighbouring cell(s) to the network/base station. In general terms, such measurements may include power measurements of some form or another, traffic volume measurements, quality measurements, etc., to enable the network to control the transmissions by the wireless devices and optimise usage of the network resources. This also allows a wireless device to be handed over from one network cell to another if for example the wireless device has moved and the coverage provided by the current cell has become inadequate. As a particular example for UMTS, such measurements may include:

Intra-frequency measurements: measurements on downlink physical channels at the same frequency as the active set and the secondary E-DCH active set. A measurement object corresponds to one cell.

Inter-frequency measurements: measurements on downlink physical channels at frequencies that differ from the frequency of the active set and on downlink physical channels in the active set. A measurement object corresponds to one cell.

Inter-RAT measurements: measurements on downlink physical channels belonging to a radio access technology other than UTRAN, e.g. GSM or E-UTRA. A measurement object corresponds to one cell (e.g. GSM) or one frequency (e.g. E-UTRA).

Traffic volume measurements: measurements on uplink traffic volume. A measurement object corresponds to one cell.

Quality measurements: measurements of downlink quality parameters, e.g. downlink transport block error rate. A measurement object corresponds to one transport channel in case of BLER. A measurement object corresponds to one timeslot in case of SIR (TDD only).

UE-internal measurements: measurements of UE transmission power and UE received signal level.

UE positioning measurements: measurements of UE position.

CSG Proximity detection: detection of the UE's proximity to one or more cells broadcasting a CSG identity that is part of the UE's CSG white list.

Thus, as a particular example in UMTS, the network configures intra-frequency measurements which causes the UE to measure Received Signal Code Power (RSCP), Ec/No (received energy per chip divided by the power density in the band), or pathloss for the frequency currently in use. As another example, in E-UTRAN (evolved UMTS Terrestrial Radio Access Network, the air interface of LTE), the UE measures RSRP (Reference Signal Received Power) or RSRQ (Reference Signal Received Quality). The network also configures inter-frequency measurements, which are similar measurements carried out by the UE at frequencies that differ from the frequency currently in use. Such measurements are carried out by the physical layer L1 of the UE. The network may also configure traffic volume measurements, quality measurements and positioning measurements to be carried out for uplink channel type selection, these measurements being carried out by the medium access control (MAC), a sublayer of the data link layer L2, of the UE. In particular, the UTRAN (Universal Terrestrial Radio Access Network) transmits a "measurement control message" to the UE, specifying inter alia the required measurement objects and quantity, criteria for measurements to be carried out, and mode (acknowledged/unacknowledged). When a reporting criterion is fulfilled, the UE responds by sending a "measurement report message", which includes the results, to the UTRAN.

Figure 2:
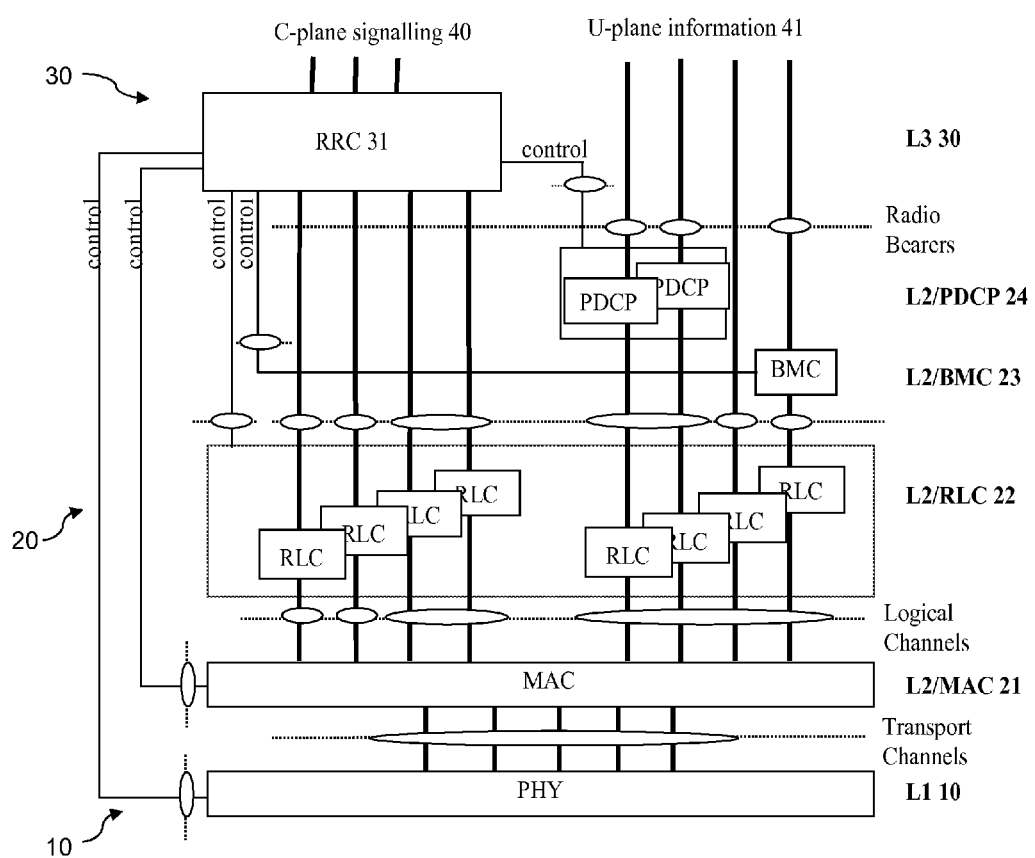
FIG. 2 shows schematically an example of a radio interface protocol architecture.

FIG. 2 shows schematically an example of the radio interface protocol architecture applicable for a UE 1 in for example UMTS. A similar "layer" architecture is used in other wireless systems, including for example E-UTRAN, though the precise details vary between systems. In overview and in general terms, there is a physical layer L1 10, a data link layer L2 20 and a network layer L3 30. The physical layer L1 10 offers information transfer services to MAC and higher layers and defines the relationship between the UE 1 and the wireless transmission medium. The data link layer L2 20 is split into following sublayers: Medium Access Control (MAC) 21, Radio Link Control (RLC) 22, Broadcast/Multicast Control (BMC) 23 and Packet Data Convergence Protocol (PDCP) 24. The network layer L3 and the RLC 22 are divided into a Control (C-) plane 40 (which in essence deals with control signals) and a User (U-) plane 41 (which in essence deals with user-generated data traffic). In the C-plane 40, the network layer L3 30 is partitioned into sublayers where the lowest sublayer, denoted as Radio Resource Control (RRC) 31, interfaces with the data link layer L2 20 and ultimately terminates in the radio access network.

As mentioned above, the UE 1 will in general generate measurement report messages which are intended to be sent to the network to convey the results of measurements carried out by the UE 1. The measurement reports are generated typically in response to criteria or triggers being met, those criteria being defined in the measurement control messages sent to the UE 1 by the network. As mentioned, the measurement reports may relate to for example one or more of intra-frequency measurements and inter-frequency measurements, which are or include RSCP, Ec/No or pathloss measurements for UMTS or RSRP or RSRQ measurements for LTE, which are carried out by the physical layer L1 10 of the UE 1, and traffic volume measurements, etc., which are carried out by the MAC 21 of the data link layer L2 20 of the UE 1. Other measurements may be made by the UE 1, typically by the physical layer L1 10 or the data link layer L2 20. In any event, the results of the measurements are passed up to the RRC 31 of the network layer L3 30 of the UE 1 by the physical layer L1 10 or the data link layer L2 20 as the case may be to be got ready for transmission to the network as measurement report messages. Prior to actual transmission, the measurement report messages are passed to the lower layers, (i.e. the data link layer L2 20 and the physical layer L1 10) and may be buffered in an uplink data buffer of the UE 1 (such as provided by a memory 3 in the UE 1) from where they are then passed to the lower layers MAC 21 and physical layer L1 10 to be transmitted by the UE 1.

It has been realised however that the UE 1 may buffer many measurement report messages prior to transmission and that this can hinder or prevent other operations being carried out. It may be for example that the UE 1 is not actually able to transmit at a particular time. This may be because of detection at the physical layer L1 10 of the "out of sync" condition. With regard to "out of sync", if the received signal quality degrades during normal operation, the UE 1 sends TPC (Transmit Power Control) commands to the network to cause an increase in the transmit power of dedicated channels. However, when the signal quality drops below a predetermined threshold for a predetermined period of time, the physical layer L1 10 notifies the RRC 31 that it is "out-of-sync" and terminates transmissions at the physical layer L1 10. This is to prevent excessive interference in the uplink being generated, which may otherwise occur because the UE 1 can no longer monitor downlink TPC commands being sent by the network and so the UE 1 does not know how much transmission power should be used for uplink data transmission. Another reason why transmissions by the UE 1 are inhibited or not possible is because the UE 1 has detected the uplink power-limited case, i.e. the case that no uplink transmission is allowed because the transmit power commanded by the network exceeds the maximum allowed uplink transmit power that the UE 1 can achieve. In any event, it has been found that this inability of the UE 1 to transmit at a particular time can cause many (in some cases as many as 20 or more) measurement report messages to be buffered in the uplink data buffer of the UE 1. In practice, it has been found that it can take 10 seconds or more for these buffered measurement report messages to be cleared out and transmitted once transmissions by the UE 1 are permitted or possible again.

This delay whilst buffered measurement report messages are being transmitted once transmission can occur again may affect other operations or processes being carried out by the UE 1. For example, it has been appreciated that this is a particular problem as it may cause an RRC response message transmission to be delayed when an RRC reconfiguration procedure or RRC security mode command procedure is being carried out and leads to the RRC connection release, or when an RRC cell update procedure is being carried out, and leads to the voice call drops and/or other loss of connectivity mentioned above. In the RRC cell update procedure, the UE 1 may transmit an RRC cell update message to the network, and then the network may transmit a cell update confirm message to the UE 1 in response to the RRC cell update message. Example triggers that may cause the initiation of the cell update procedure are cell reselection if the UE is in the CELL_FACH (forward access channel) RRC state and radio link failure or RLC unrecoverable error if the UE is in CELL_DCH (dedicated channel) RRC state. Both of these example triggers may occur as a result of mobility of the UE 1, for example, such that the coverage provided by the current cell becomes inadequate for the UE 1, which results in the UE 1 determining that it needs to move to a different, neighbouring cell in order to obtain better coverage. Once the network has sent the cell update confirm message to the UE 1, the network expects to receive back a message from the UE 1, which varies according to the circumstances. It may be that the message confirms that the UE 1 has carried out the required reconfiguration to allow it to be handed over to the new cell. Or it may be that the UE 1 is unable to carry out the required reconfiguration to allow it to be handed over to the new cell for some reason, and the UE 1 therefore sends a connection failure message.

In practice, it has been observed that the sending back of this message by the UE 1 in response to receiving the cell update confirm message during the cell update procedure can be delayed because the UE 1 has buffered a number of measurement report messages as it was not able to transmit them immediately. In particular, the UE 1 was clearing out those measurement report messages and transmitting them as a first step once transmissions were permitted or possible again. As mentioned above, however, this can take some time, for example around 10 seconds or more, leading to delay in the UE 1 transmitting its cell update procedure message in response to receiving the cell update confirm message from the network. This delay in receiving a response to the cell update confirm message is however unacceptable to the network, which caused the connection, or at least any voice call, to be dropped by the network as it assumes that connection with the UE 1 has been lost after a certain period of time has elapsed from sending the cell update confirm message with no response having been received from the UE 1. (In detail, the network may release the RRC connection or may just release the dedicated resources allocated for the UE and re-allocate necessary dedicated resources for the UE during a cell update procedure. In the latter case, the RRC connection as such is not released but at least the physical layer L1 10 connection is temporarily dropped. Either way, for the user, the effect is that the connection is lost.)

In an example of an embodiment of the present invention, the UE 1 operates so as to prevent multiple measurement report messages being stored in its uplink data buffer, and thus avoids having to attempt transmitting plural measurement report messages once the UE 1 is able to transmit again. In an example, this is achieved by the UE 1 suspending passing of a RRC measurement report message from the RRC 31 to the lower layers (i.e. the data link layer L2 20 and the physical layer L1 10) in the UE 1 in anticipation of sending the RRC measurement report message to the network if one of a number of specific events occurs, the events typically relating to the inability of the UE 1 to be able to transmit to the network at a particular time. An example of a suitable trigger event for this is the "out of sync" condition mentioned above. Another example is the uplink power-limited case mentioned above.

The UE 1 may buffer in a memory device a single measurement report message per measurement event (such as event 1a, 1b, 1c, 2a, 2b, 2c, 2d, or 2f specified in 3GPP TS 25.331) and per periodic measurement (such as for intra-frequency measurement and for inter-frequency measurement) while transmission of the measurement report messages from the RRC 31 to the lower layers of the UE 1 is suspended. If a new measurement report message comes up for a measurement event and/or periodic measurement, then the previous measurement report buffered for that event or measurement will be overwritten by the new one. In other words, the UE 1 stores only the latest measurement report in its uplink data buffer in this example. As an alternative, it may be that the UE 1 will buffer only a limited plurality (such as between 2 and 10 by way of example) of measurement report messages per measurement event and per periodic measurement (such as for intra-frequency and inter-frequency measurements) while transmission of the measurement report messages from the RRC 31 to the lower layers of the UE 1 is suspended. This may be implemented using some flow control between the RRC 31 and the RLC 22 for example.

The UE 1 in an example will typically resume transmission of the RRC measurement report messages to the lower layers at some point. For example, this resumption of transmission of the RRC measurement report messages to the lower layers may occur if one of the following conditions is met:

1. the physical layer L1 10 signals re-sync (i.e. that the "out-of-sync" condition discussed above no longer applies), or 2. uplink data transmission is resumed after a call re-establishment (i.e. after a cell update procedure); in either case for 1. and 2 if it was the "out-of-sync" condition discussed above that caused transmission of the measurement report messages to be suspended; or:

3. uplink power is no longer limited (i.e. when uplink data transmission is allowed in terms of uplink power) in the case that the uplink power-limited case discussed above caused transmission of the measurement report messages to be suspended.

In an example, when RRC measurement report message transmission to the lower layers in the UE 1 is resumed, the RRC 31 transmits the measurement report message(s) that have been buffered in the uplink data buffer of the UE 1 to the lower layers, so that the measurement report message(s) can then be transmitted wirelessly by the UE 1 to the network. Because the number of measurement report messages stored in the buffer for transmission has been minimised (effectively being at most the minimum that is required to report the results of the most recent measurements and therefore giving (only) the "current" measurement results), there is minimal delay for transmission of other messages or data and the like. This includes for example the transmission of the message by the UE 1 in response to receiving a cell update confirm ("CellUpdateConfirm") message during a cell update procedure as discussed above. This will therefore reduce the likelihood that the network will regard the connection with the UE 1 as lost and thus minimise the dropping of calls or other loss of connectivity for the user.

In an example, it may be that, on resumption of transmission, the UE 1 prioritises other RRC uplink message transmissions that are deemed to be more important than the measurement report message(s) and transmits those other RRC uplink messages to the network first. Other RRC uplink messages that may be deemed more important include for example RRC response messages for a CellUpdateConfirm as discussed above, reconfiguration command messages and security mode command messages. This helps to ensure that important RRC messages are transmitted quickly upon resumption of uplink data transmissions, and again reduces the likelihood that the network will regard the connection with the UE 1 as lost and thus minimise the dropping of calls or other loss of connectivity for the user.

Also, in an example, UE RRC 31 may discard buffered measurement report messages that are no longer valid after a certain RRC procedure has been carried out if that RRC procedure was carried out before the resumption of transmissions. Examples of such RRC procedures includes the cell update procedure and RRC activity state transition. This saves unnecessary transmission of measurement report messages that are no longer useful. If transmission of the RRC response messages for a CellUpdateConfirm as discussed above follows transmission of the buffered measurement report messages, this will also reduce the time before the RRC response messages for the CellUpdateConfirm are transmitted, again reducing dropping of calls or other loss of connectivity for the user. Also, given that measurement report messages that are no longer valid are discarded and not transmitted, this minimises the possibility that the network could be "confused" by receiving invalid reports, which again reduces the likelihood that calls may be dropped or other connectivity is lost.

Figure 3A:
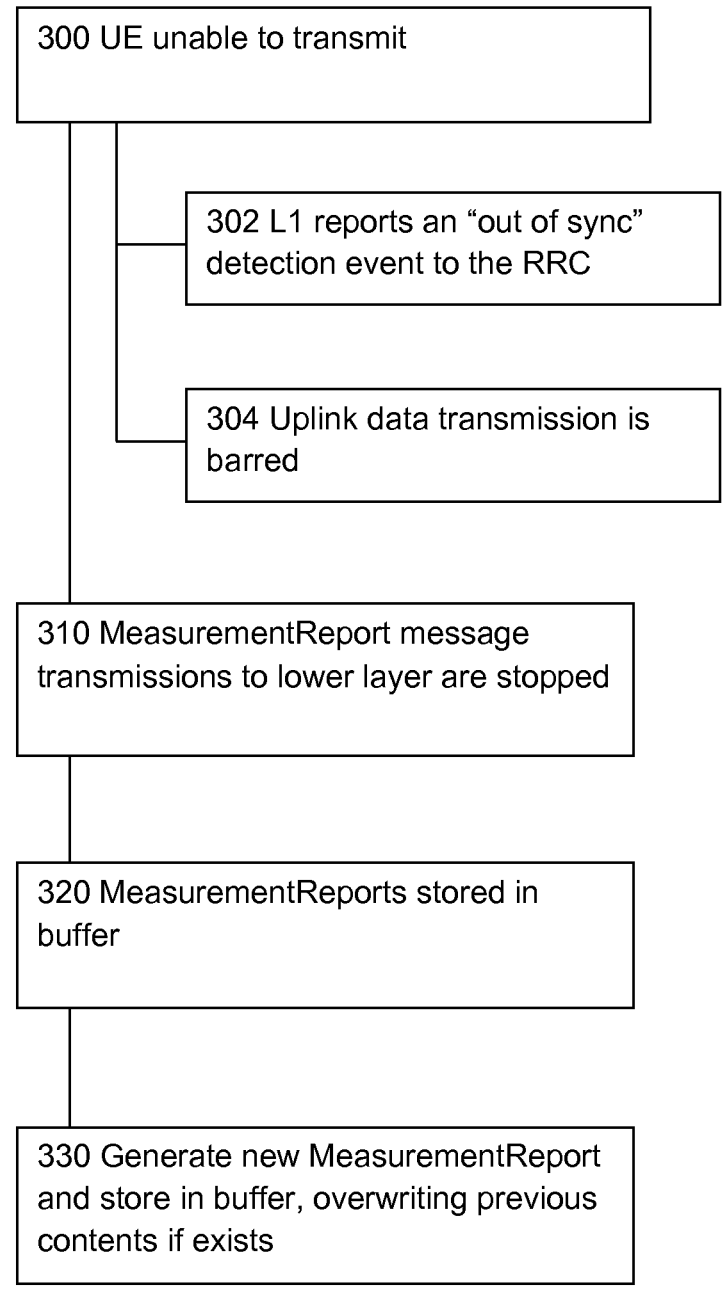
FIGS. 3A and 3B show schematically steps carried out in an example of a method according to an embodiment of the present invention.
Figure 3B:
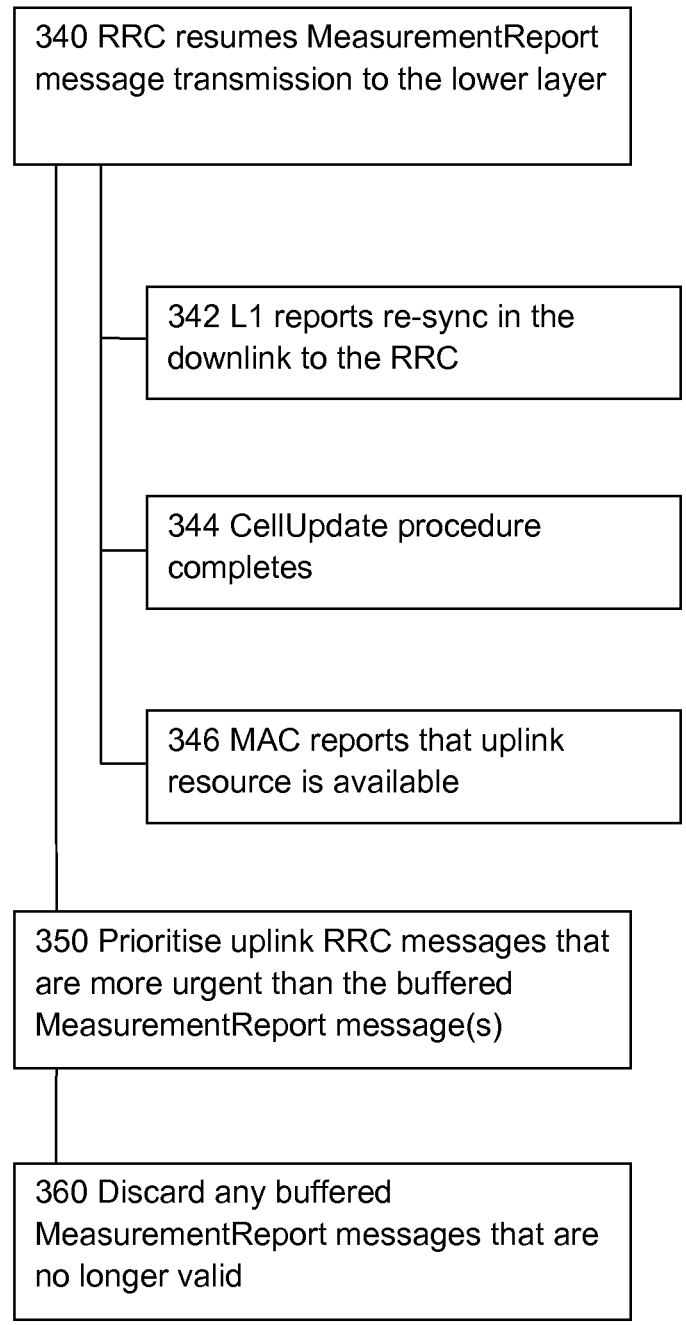

FIGS. 3A and 3B show schematically steps carried out in a specific example of a method according to an embodiment of the present invention.

Referring first to FIG. 3A, in step 300, the UE 1 determines that it is unable to transmit. This may be because the physical layer L1 10 reports 302 an "out of sync" detection event to the RRC 31. Alternatively or additionally, this may be because uplink data transmission is barred, for example due to uplink power limitation. Other criteria may apply.

At 310, the RRC Measurement handling entity 31 stops MeasurementReport message transmissions to the lower layers (in particular the data link layer L2 20 and the physical layer L1 10) when the event relating to the inability to transmit is reported. At 320, the RRC Measurement handling entity 31 stores a MeasurementReport generated upon receipt of measured results from a lower layer (such as the physical layer L1 10 or the MAC 21) in a corresponding buffer. There is storage available for a MeasurementReport per measurement event, plus a MeasurementReport for intra-frequency periodical measurement and a MeasurementReport for inter-frequency periodical measurement. At 330, if the RRC receives another measured result from a lower layer, then the RRC 31 generates a new MeasurementReport based on the newly received measured results and stores it in the corresponding buffer, overwriting any previously buffered MeasurementReport message that is in the corresponding buffer if one exists.

Referring now to FIG. 3B, at 340, the RRC 31 resumes MeasurementReport message transmission to the lower layers (in particular the data link layer L2 20 and the physical layer L1 10) if it is determined that transmissions by the UE 1 can recommence. This may occur if for example the physical layer L1 10 reports 342 re-sync in the downlink to the RRC 31. Alternatively or additionally, this may occur if a CellUpdate procedure completes 344. Alternatively or additionally, this may occur if the 21 MAC reports 346 that the uplink resource is available (i.e. uplink data transmission is allowed).

In addition, as indicated at 350, when MeasurementReport message transmission is resumed, the UE 1 may prioritise uplink RRC messages that are more urgent than the buffered MeasurementReport message(s). That is, the more urgent uplink RRC messages are sent first, and then the buffered MeasurementReport message(s) are sent afterwards. In addition, as indicated at 360, when MeasurementReport message transmission is resumed, the UE 1 may discard any buffered MeasurementReport messages that are no longer valid at the time of the resumption.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of operating a wireless device, the method comprising:
the wireless device determining that wireless transmissions to a network are not possible due to
a physical layer of the device notifying a radio resource control entity of the wireless device that an out of sync condition has been detected by the wireless device, or
a transmit power commanded by the network exceeds a maximum allowed uplink transmit power that the wireless device can achieve;
the radio resource control entity of the wireless device suspending passing of measurement report messages to a lower layer of the wireless device for transmission to the network by the wireless device in response to the wireless device determining that wireless transmissions to the network are not possible, the lower level being one of a PHY layer and a data link layer, and
restricting one or more measurement report messages from being stored in an uplink data buffer while the transmissions from the wireless device are not possible so as to reduce a total number of attempted transmissions of measurement reports, relative to an unrestricted number of stored measurement reports, after the wireless device determines that wireless transmissions are once again possible.

2. The method according to claim 1, wherein the wireless device determines that wireless transmissions to the network are not possible due to a received signal quality at the wireless device from the network falling below a predetermined threshold for a predetermined period of time.

3. The method according to claim 1, wherein, whilst passing of measurement report messages to the lower layer of the wireless device is suspended, the wireless device buffers in the uplink data buffer less than a predetermined number of measurement report messages.

4. The method according to claim 1, wherein, whilst passing of measurement report messages to the lower layer of the wireless device is suspended, the wireless device buffers in the uplink data buffer a single measurement report message for each measurement event and for each periodic measurement.

5. An apparatus comprising a processing system for a wireless device, the apparatus comprising:
a processor configured to
determine whether or not wireless transmissions to a network by said wireless device are not possible due to
a physical layer of the device notifying a radio resource control entity of the wireless device that an out of sync condition has been detected by the wireless device, or
a transmit power commanded by the network exceeds a maximum allowed uplink transmit power that the wireless device can achieve, and
suspend via a radio resource control entity of the wireless device passing of measurement report messages to a lower layer of the wireless device for transmission to a said network by the wireless device in response to the wireless device determining that wireless transmissions to the network are not possible, the lower level being one of a PHY layer and a data link layer; and
an uplink data buffer, wherein the processor is further configured to restrict one or more measurement report messages from being stored in the uplink data buffer while the transmissions from the wireless device are not possible so as to reduce a total number of attempted transmissions of measurement reports, relative to an unrestricted number of stored measurement reports, after the wireless device determines that wireless transmissions are once again possible.

6. The apparatus according to claim 5, arranged such that it is determined that wireless transmissions to a network are not possible due to a received signal quality at the wireless device from the network falling below a predetermined threshold for a predetermined period of time.

7. The apparatus according to claim 5, arranged such that, whilst passing of measurement report messages to the lower layer of the wireless device is suspended, the wireless device buffers in the uplink data buffer less than a predetermined number of measurement report messages.

8. The apparatus according to claim 5, arranged such that, whilst passing of measurement report messages to the lower layer of the wireless device is suspended, the wireless device buffers in the uplink data buffer a single measurement report message for each measurement event and for each periodic measurement.

9. The apparatus-according to claim 8, arranged such that in response to a new measurement report message being generated for one of the measurement events or periodic measurements, the new measurement report message is buffered in place of the previously buffered measurement report message for said measurement event or periodic measurement.

10. The apparatus according to claim 5, arranged such that the wireless device resumes passing of measurement report messages to the lower layer of the wireless device for transmission to a network by the wireless device in response to the wireless device determining that wireless transmissions to said network may be resumed.

11. The apparatus according to claim 10, arranged such that the wireless device transmits an uplink message other than the measurement report messages to said network prior to transmitting the measurement report messages when the wireless device has determined that wireless transmissions may be resumed.

12. The apparatus according to claim 11, wherein said other uplink message is at least one of an RRC response message for a CellUpdateConfirm, a reconfiguration command message, a security mode command message and an RRC signalling connection release indication message.

13. The apparatus according to claim 5, arranged such that the wireless device discards buffered measurement report messages that are no longer valid to avoid transmission of said measurement report messages that are no longer valid in response to the wireless device determining that wireless transmissions to the network may be resumed.

14. The apparatus according to claim 5, configured to operate according to at least one of Universal Mobile Telecommunications System and Long Term Evolution.

15. A wireless device comprising apparatus comprising a processing system according to claim 5.

16. A non-transitory computer program comprising instructions such that when the computer program is executed on a wireless device, the wireless device is configured to:
- determine whether or not wireless transmissions to a network by said wireless device are not possible due to
  - a physical layer of the device notifying a radio resource control entity of the wireless device that an out of sync condition has been detected by the wireless device, or
  - a transmit power commanded by the network exceeds a maximum allowed uplink transmit power that the wireless device can achieve; and
- suspend via a radio resource control entity of the wireless device passing of measurement report messages to a lower layer of the wireless device for transmission to a said network by the wireless device in response to the wireless device determining that wireless transmissions to the network are not possible, the lower level being one of a PHY layer and a data link layer, and
- restrict one or more measurement report messages from being stored in an uplink data buffer while the transmissions from the wireless device are not possible so as to reduce a total number of attempted transmissions of measurement reports, relative to an unrestricted number of stored measurement reports, after the wireless device determines that wireless transmissions are once again possible.

* * * * *